J. J. Greenough,
Pegging Machine,
No. 701, Reissued Apr. 26, 1859.
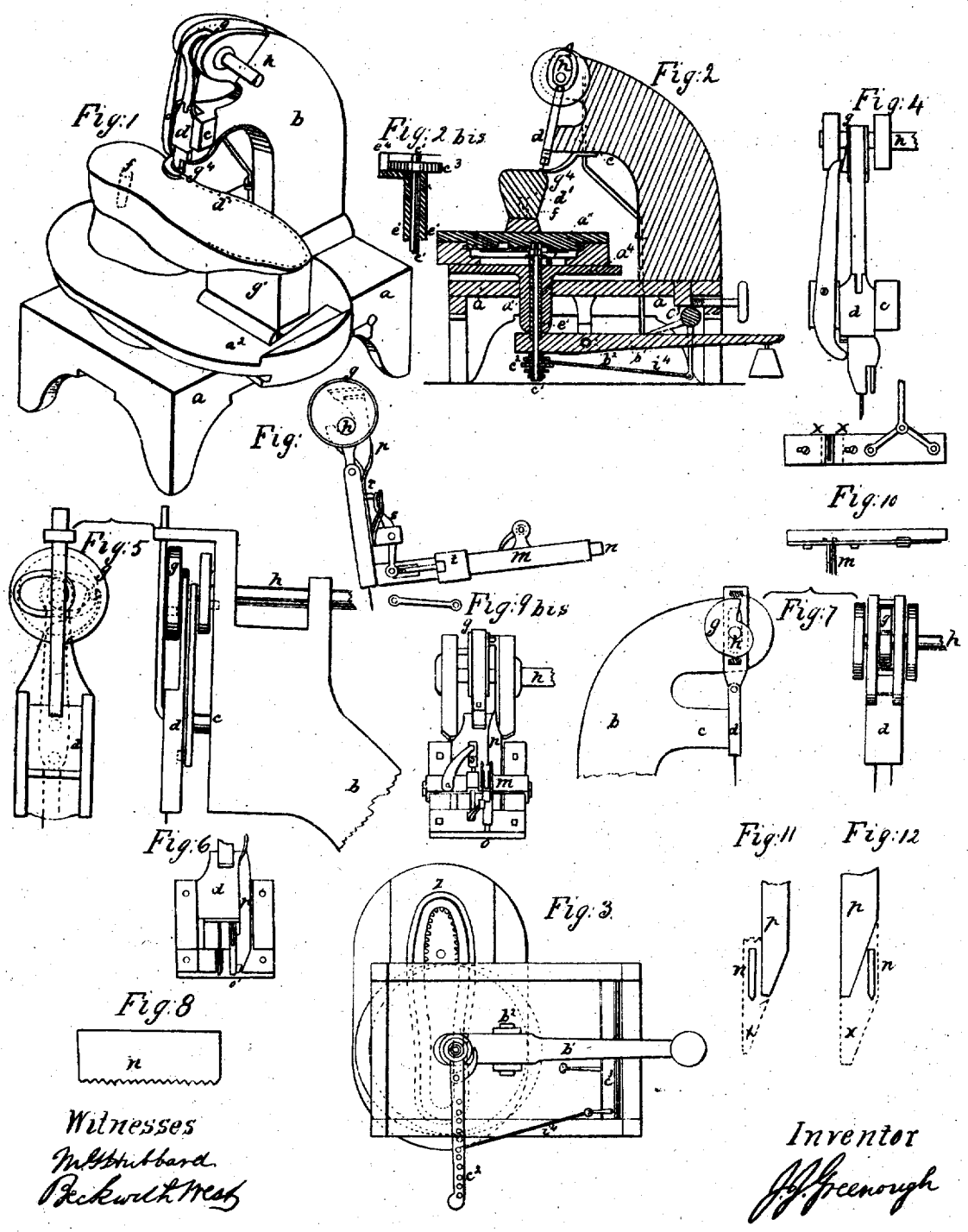
Witnesses
M. L. Hubbard
Beckwith West
Inventor
J. J. Greenough

UNITED STATES PATENT OFFICE.

JOHN JAMES GREENOUGH, OF NEW YORK, N. Y.

IMPROVEMENT IN MACHINES FOR PEGGING BOOTS AND SHOES.

Specification forming part of Letters Patent No. 10,427 dated January 17, 1854; Reissue No. 269, dated July 4, 1854; Reissue No. 701, dated April 26, 1859.

*To all whom it may concern:*

Be it known that I, JOHN JAMES GREENOUGH, of the city, county, and State of New York, have obtained Letters Patent of the United States, dated the 17th day of January, 1854, for several inventions in Shoe-Pegging Machinery, which I now desire to separate, and to have reissued to me in several distinct patents; and I do hereby declare and ascertain one of my said inventions contained in said Letters Patent, referring to the accompanying drawings in which—

Figure 1 is a perspective view of the machine; Fig. 2, vertical section; Fig. 3, plan from below; Fig. 4, awl and peg-stock detached; Fig. 5, modification; Fig. 6, front view of pegging-stock, &c.; Fig. 7, modified section; Fig. 8, peg-wood; Fig. 9, peg-feed; Figs. 10, 11, 12, peg-cutters.

My invention relates to the method of holding the shoe or boot during the pegging operation and moving it to the pegging apparatus in the line of the intended row of pegs; and the first part of my said invention consists in connecting the last with an apparatus so that the last may be turned and moved in any desired direction in a horizontal plane, that every part of the line on which the pegs are to be inserted, whatever that may be, may be brought in succession to the pegging apparatus, when this is combined with a mechanism which tends constantly to force it upward against a rest or guide, but which will permit it to yield downward, that the sole of the shoe or boot may, as it moves along, continue in contact with the rest or guide, however the sole may vary from a plane; and the last part of my said invention consists in moving and guiding the last or holder automatically, to present every part of the sole to be pegged in succession to the pegging apparatus, and in the line of the intended row of pegs, whatever that may be, by means of a guide-groove, $z$, and guide, and a pinion engaging the cogs of a rack, in line corresponding with the form of the guide-groove, or nearly so, when this is combined with the table having the capacity of universal movement, as above stated.

The drawings, Figs. 1 and 2, show a table, $a''$, sustained on an upright spindle, $a'$, supported on the end of a horizontal lever, $b'$, which is weighted on the opposite end to counterbalance the shoe-holding apparatus with sufficient force against the point where the shoe is to be pegged, and resist the force of the awl and peg-driver. On the top of the table are plates which slide in grooves at right angles to each other, so as to allow the top plate, $a^2$, a motion in every direction horizontally, or by merely resting this top plate, $a^2$, upon the plane surface of the table it can be slid in all directions upon the table $a''$. The top plate, $a^2$, has the shoe-clamp affixed to it, which may have motion that is calculated to present the shoe in an inclined position as required for pegging properly, inclining the pegs inward, or the stock for pegging may be made to slide in inclined ways for the same purpose.

To attach the shoe readily to the clamp, I form a hole in the last at $f$, in which a stout steel pin is inserted that is affixed to the clamp, and a sliding piece, $g$, is driven under the toe of the shoe by means of a wedge, screw, or other suitable device. This causes a binding action upon the pin at $f$ and firmly fastens the shoe. It is obvious that if the pin were to slide or swivel so as to bring the toe of the shoe firmly down upon the toe-piece the same effect would be produced.

If the shoe is moved by any apparatus acting upon the shoe itself, no further machinery is necessary; but if it is to be moved automatically, I employ the following machinery to move it: The plate $a^2$, to which the shoe is attached, has a groove, $z$, Fig. 3, formed in it on the under side, on the line, or nearly so, upon which the pegs are to be driven. A row of cogs follows the curve of the groove, as clearly represented in Fig. 3. A shaft, $c'$, extends up through the hollow mandrel, and its upper end enters the groove. Upon this shaft $c'$ there is a pinion, $c^3$, the teeth of which gear into the cogs upon the plate, so that by turning the pinion the groove will be made to pass along over the shaft and be guided by it. A tube, $e'$, surrounds the shaft $c'$, and is affixed by its lower end to the lever $b'$, so that it cannot turn. On its upper end it bears a short horizontal arm that projects beyond the pinion, and a guide-pin, $e^4$, outside the pinion and at a sufficient distance from the end of the shaft to guide the course and turning of the shoe, projects up into the groove, keeping two points of the groove $e^4$ and $c'$, (see Fig. 2,) always in the same relative position in relation to the stationary parts of the machine, and causes the carriage to turn upon the groove-curves. The shaft $c'$ above named projects below the lever $b'$, on the lower end of which there is a ratchet-wheel with pawl and clutch attached to a horizontal lever, $c^2$, by which the shaft and pinion are worked in one direction, at intervals, by means of the reciprocating motion of the lever produced by its connection with the moving parts. This may be effected in the following way: An axis, $c^3$, is placed horizontally under the platform or table $a'$, to which are attached arms at right angles to each other. The vertical arm is connected by a rod, $i^4$, with the lever $c^2$, while the other arm is connected either with the pegging-stock or other moving part so as to be vibrated, and thus move the upper plate of the carriage at intervals, leaving it at rest when the awl and pegging-stock descend to drive the peg.

It will be obvious from the foregoing that the first part of my said invention may be applied independently of the means above described for moving the last automatically, by substituting any other efficient mode of feeding and guiding or by performing the feeding and guiding movement by hand, and therefore I do not wish to be understood as limiting my claim of invention to the employment of the several parts of my said invention in connection.

The apparatus for forming the pegs and feeding them into the driving apparatus consists of a trough, through which strips of wood are fed, made like the ordinary pegs used in shoe manufacture, but only split off one way, so as to present a series of pegs in a row, as seen in Fig. 8, attached together in a strip. The strip of peg-wood is fed forward at intervals, the breadth of a single peg at a time, by a feed that is perpetual, or such as will feed an infinite series of pegs in succession. This may be effected by a variety of apparatus—such as feed-rollers, or a feed-roller and spring, or an endless screw working into the lower serrated edge of the peg-wood, or by a device shown in the drawings at Fig. 9, all of which are well known endless feeds, and are but the equivalents of each other.

The device shown at Fig. 9 is a reciprocating feed, in which $m$ is the trough through which the peg-wood $n$ passes. On this trough, or beside it, there is a slide, $t$, that is made to slide by a vibrating lever, $s$, to the lower end of which it is attached by a connecting rod. The lever $s$ is vibrated by the upward and downward motion of the pegging-stock, (which will be hereinafter described,) so that when the pegging-stock rises the peg-wood is fed forward and cut off, ready to be driven as the pegging-stock descends. To cut off the peg properly a cutter must pass through it in a line perpendicular to the top and bottom lines of the peg-strip and at right angles to the side thereof, the cut being made from side to side through the peg-strip without regard to the course of the grain of the wood. This cut may be made by forcing a knife having an inclined back downward, so as to cut across the peg-wood, as seen in Fig. 11, in which $n$ is the cross-section of the peg-wood; $p$, the knife in position before the cut is made; $x$, dotted lines showing the cut made.

Fig. 12 shows a modification, in which the edge of the cutter is inclined, which performs a somewhat similar action by being pushed downward into the position shown by dotted lines. Another mode is to force the edge of a knife that is parallel with the side of the peg-strip straight forward across it in a plane of motion at right angles thereto, as seen in Fig. 10, the dotted line showing the range of motion. The combined action of these parts is, first, forcing forward the peg-wood into the recess; and, secondly, cutting off with the knife, which is actuated by a cam, crank-pin, or eccentric, from the driving shaft. The peg-driver and awl for making the holes and inserting the pegs may be on separate stocks and driven alternately; but I prefer to put them both into one sliding stock, which is made to slide up and down in the frame or standard of the machine.

In Fig. 1, $a$ $a$ is the base of the frame, from which rises the standard $b$, that at its upper end projects over sufficiently at $c$ to hold the slide that pegs the shoe, and above the slide is the driving-shaft $h$, from which all the parts are moved. On this shaft there is an eccentric, or crank, or cam, $g$, (the latter is shown in the drawings,) of any style known, that will give the desired motion, which may be regular like a simple crank, or eccentric or irregular. This latter can be effected by the cam seen in Fig. 1, or by a grooved cam, and this irregular motion I prefer; but it is essential that the motions up and down should be positive and controlled in their range, forcing down the awl and peg to the precise point and drawing them back to a proper point at each action. The awl and peg-driver stock is shown at Fig. 4 detached. At Fig. 5 a modification is seen. The peg-driver $d$ plays up and down in the recess $o$, Fig. 6, into which the peg-strip is fed, when the peg-driver is raised and the peg is then cut off, (or it may have been previously cut off,) and as the peg-driver descends it forces the peg down through the sole of the boot or shoe into the hole previously made for it by the awl.

The device for moving the shoe by the awl requires the awl to descend down into the sole at a sufficient distance from the preceding peg to set the next peg. When the awl is driven into the sole, the stock is moved sidewise by a cam or other equivalent device. The stock may either slide sidewise or turn on an arm of sufficient radius to change the angle of the awl but little. Fig. 4 shows the first, and Fig. 5 the second, method. The slide movement of the stock when the awl is in the shoe-sole carries the shoe along the same distance, and brings the hole thus made in the sole in line with the peg when driven—the effect being the same whether the sole is carried along straight or is swiveled to peg round a curve, the motion of the shoe being entirely dependent upon the awl as a center.

What I claim as my invention, and desire to secure by Letters Patent, is—

1. Connecting the last with a horizontal slide or plate capable of presenting the shoe or boot, substantially as described, so that the shoe or boot attached thereto may be turned and moved in any direction in a horizontal or inclined course, in combination with a mechanism, substantially such as described, which tends constantly to force it upward against a rest or guide, but which will permit it to yield downward, as described; but this combination I claim only when combined with the pegging mechanism above described, or any equivalent therefor.

2. As an automatic means of moving and guiding the last to present it to the pegging apparatus in the required line of pegging, the guide-groove and guide, and pinion and curved rack, substantially as described, in combination with the mechanism above described, or the equivalent thereof, which permit the last to be moved in any desired direction, as set forth.

J. J. GREENOUGH.

Witnesses:
JAS. W. FRASER,
I. SMITH.